US009984778B2

(12) United States Patent
Song et al.

(10) Patent No.: US 9,984,778 B2
(45) Date of Patent: May 29, 2018

(54) COOLING SYSTEM OF NUCLEAR REACTOR CONTAINMENT STRUCTURE

(71) Applicants: Korea Atomic Energy Research Institute, Daejeon (KR); Korea Hydro & Nuclear Power Co., Ltd, Gyeongju-si, Gyeongsangbuk-do (KR)

(72) Inventors: Jin Ho Song, Seoul (KR); Kwang Soon Ha, Daejeon (KR); Hwan Yeol Kim, Daejeon (KR); Yong Mann Song, Daejeon (KR)

(73) Assignees: KOREA ATOMIC ENERGY RESEARCH INSTITUTE, Daejeon (KR); KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 632 days.

(21) Appl. No.: 14/308,524

(22) Filed: Jun. 18, 2014

(65) Prior Publication Data

US 2014/0376679 A1  Dec. 25, 2014

(30) Foreign Application Priority Data

Jun. 19, 2013 (KR) .................. 10-2013-0070458
Mar. 27, 2014 (KR) .................. 10-2014-0035994

(51) Int. Cl.
*G21C 9/004* (2006.01)
*G21C 15/18* (2006.01)
*G21C 13/02* (2006.01)

(52) U.S. Cl.
CPC ............ *G21C 15/18* (2013.01); *G21C 9/004* (2013.01); *G21C 13/022* (2013.01); *Y02E 30/40* (2013.01)

(58) Field of Classification Search
CPC ......... Y02E 30/40; Y02E 30/32; Y02E 30/39; Y02E 30/31; Y02E 30/34; Y02E 30/36;
(Continued)

(56) References Cited

U.S. PATENT DOCUMENTS 1,353,457 A * 9/1920 Crosthwait, Jr. ......... F22D 5/08
137/165
3,115,450 A * 12/1963 Schanz .................... G21C 9/00
250/515.1
(Continued)

FOREIGN PATENT DOCUMENTS

CN      101700450 A      5/2010
CN      102723114 A      10/2012
(Continued)

OTHER PUBLICATIONS

Office Action dated Mar. 24, 2015 of corresponding Japanese Patent Application No. 2014-115454—4 pages.

*Primary Examiner* — Sharon M Davis
(74) *Attorney, Agent, or Firm* — Knobbe Martens Olson & Bear LLP (57) ABSTRACT

A nuclear power plant includes a nuclear reactor containment structure housing a nuclear reactor, a pressure vessel containing condensed water therein and having a receiving space located lower than a bottom of the containment structure, a release pipe connecting the containment structure to the pressure vessel such that water vapor and fission products generated in the containment structure in the event of an accident is capable of flowing into the pressure vessel, and a recovery pipe connecting the pressure vessel to the containment structure such that the condensed water received in the pressure vessel is capable of flowing into the containment structure. When a level of the condensed water received in the pressure vessel is higher than a water level
(Continued)

in the containment structure, the condensed water flows from the pressure vessel toward the containment structure by a water head difference.

18 Claims, 7 Drawing Sheets

(58) Field of Classification Search
CPC ....... Y02E 30/38; Y02E 60/366; G21C 15/18; G21C 9/00; G21C 9/004; G21C 9/008; G21C 9/012; G21C 13/022; G21C 1/322; G21C 15/12; G21C 1/086; G21C 1/32; G21C 13/02; G21C 13/00; G21D 1/02; G21D 1/04
USPC ....... 376/282, 283, 298, 299, 293, 280, 294, 376/264, 277, 287, 307, 203, 210, 219, 376/289, 214, 241, 245, 260, 306, 309, 376/310, 316, 327, 328, 334, 352, 353, 376/406, 217, 220, 221, 250, 258, 262, 376/263, 267, 281, 288, 295, 313, 314, 376/361, 363, 366, 367, 370, 375, 379, 376/398

See application file for complete search history.

(56) References Cited

U.S. PATENT DOCUMENTS

| | | | | | |
|---|---|---|---|---|---|
| 3,166,479 | A | * | 1/1965 | Bjorn | F01K 1/00 376/283 |
| 3,508,090 | A | * | 4/1970 | Wilkinson | B01D 53/26 310/11 |
| 3,889,707 | A | * | 6/1975 | Fay | B01J 19/002 137/251.1 |
| 4,022,655 | A | * | 5/1977 | Gaouditz | G21C 9/012 261/121.1 |
| 4,033,814 | A | * | 7/1977 | Bregeon | G21C 1/14 376/298 |
| 4,104,119 | A | * | 8/1978 | Schilling | G21C 15/18 376/282 |
| 4,440,719 | A | * | 4/1984 | Howard | G21C 1/08 376/282 |
| 4,478,784 | A | * | 10/1984 | Burelbach | G21C 1/03 165/274 |
| 4,687,626 | A | * | 8/1987 | Tong | F22B 37/42 376/283 |
| 4,753,771 | A | * | 6/1988 | Conway | G21C 15/18 376/282 |
| 4,799,538 | A | * | 1/1989 | Dagard | F28B 1/02 122/34 |
| 5,120,490 | A | * | 6/1992 | Koshiishi | G21C 15/18 376/282 |
| 5,612,982 | A | * | 3/1997 | Woodcock | G21C 15/18 376/298 |
| 2006/0188055 | A1 | * | 8/2006 | Eckardt | B01D 47/10 376/283 |
| 2009/0080589 | A1 | * | 3/2009 | Sato | G21C 9/016 376/280 |
| 2009/0129530 | A1 | * | 5/2009 | Reyes, Jr. | G21C 1/32 376/282 |

FOREIGN PATENT DOCUMENTS

| | | |
|---|---|---|
| JP | 47-012120 Y1 | 4/1972 |
| JP | 54-044190 A | 4/1979 |
| JP | 55-085292 A | 6/1980 |
| JP | 62-190491 A | 8/1987 |
| JP | 01-199192 A | 8/1989 |
| JP | 7-209488 A | 8/1995 |
| JP | 08-278386 A | 10/1996 |
| JP | 09-159782 A | 6/1997 |
| JP | 2000-292581 A | 10/2000 |
| JP | 2001-228279 A | 8/2001 |
| JP | 2004-239817 A | 8/2004 |
| JP | 2012-230078 A | 11/2012 |
| JP | 2013-72879 A | 4/2013 |
| KR | 93-003059 B1 | 4/1993 |

* cited by examiner

COOLING SYSTEM OF NUCLEAR REACTOR CONTAINMENT STRUCTURE

CROSS-REFERENCE TO RELATED APPLICATION

This application claims priority to and the benefit of Korean Patent Application No. 10-2013-0070458, filed on Jun. 19, 2013 and Korean Patent Application No. 10-2014-0035994, filed on Mar. 27, 2014, the disclosure of which is incorporated herein by reference in its entirety.

BACKGROUND

1. Field

The present disclosure relates to a cooling system for cooling a nuclear reactor containment structure in the event of a severe accident, and more particularly, to a cooling system of a nuclear reactor containment structure, capable of being driven for a long time by natural convection without supply of power.

2. Discussion of Related Art

In order to prevent damage of a containment building housing a nuclear reactor due to an increase in pressure of the containment building and a large leakage of fission products due to the damage when a severe accident occurs in the nuclear reactor, the containment building includes a release port installed thereto and a filtered exhaust apparatus which condenses and removes water vapor and fission products generated in the nuclear reactor.

Since such a filtered exhaust apparatus, however, has to continuously condense vapor, which continues to be generated in a containment vessel, in a vessel outside the containment vessel, the vessel should significantly increase in size in order to increase operating hours of the filtered exhaust apparatus without an operator's intervention. Currently, the operating hours of the filtered exhaust apparatus is approximately one day. However, it is identified that power restoration of the filtered exhaust apparatus may take a long time after the Fukushima nuclear accident. Therefore, in order to prepare for this situation, there is a need for a filtered exhaust apparatus which may be driven for more than 72 hours without supply of power.

In addition, when the filtered exhaust apparatus is driven for a long time, condensed water within an exhaust apparatus has an increasing temperature and a filter has an increasing temperature due to fission products accumulated in the filter, thereby rapidly deteriorating removal performance of fission products required for the filter.

Meanwhile, since the conventional systems for condensing and filtering vapor cause undesired water hammer by releasing vapor into an overcooled water tank in an initial operation of the filtered exhaust apparatus, pipes and devices related thereto may be damaged.

Consequently, there is a need for methods to solve the above problems.

SUMMARY

One aspect of the present invention is directed to a cooling system of a nuclear reactor containment structure, capable of being driven for a long time by natural convection without supply of power.

Additional advantages and features of the invention will be set forth in part in the description which follows and in part will become apparent to those having ordinary skill in the art upon examination of the following or may be learned from practice of the invention.

According to an aspect of the present invention, a cooling system of a nuclear reactor containment structure includes a containment structure housing a nuclear reactor, a pressure vessel which receives condensed water therein and has a receiving space located such that at least a portion of the pressure vessel is lower than a bottom of the containment structure, a release pipe connecting an inner portion of the containment structure to an inner portion of the pressure vessel such that water vapor and fission products generated in the containment structure in the event of an accident is capable of flowing into the pressure vessel, and a recovery pipe connecting the inner portion of the pressure vessel to the inner portion of the containment structure such that the condensed water received in the pressure vessel is capable of flowing into the containment structure, wherein when a level of the condensed water received in the pressure vessel is higher than a water level in the containment structure, the condensed water flows from the pressure vessel toward the containment structure by a water head difference.

The pressure vessel may be provided with one or more radiation fins.

In addition, a cooling pool receiving cooling water may be formed around a lower portion of the pressure vessel.

The cooling system may further include an exhaust pipe connected to the pressure vessel such that gas generated within the pressure vessel is discharged out thereof through the exhaust pipe.

The pressure vessel may include a filter for removal of fission products.

The pressure vessel may include a moisture separator located beneath the filter.

The release pipe may store non-condensable gas and may be provided with a gas tank to which the non-condensable gas is selectively released.

The gas tank may be further provided with a gas release valve for adjusting release of the non-condensable gas and a gas flow restrictor for controlling a release amount of the non-condensable gas.

The release pipe may be provided with a release isolation valve located in an inner exposed portion of the containment structure thereon, and the release pipe may be provided with a first release valve located in an outer exposed portion of the containment structure thereon.

The recovery pipe may be provided with a recovery isolation valve located in an inner exposed portion of the containment structure thereon, and the recovery pipe may be provided with a recovery valve located in an outer exposed portion of the containment structure thereon.

The pressure vessel may be provided with a supply tank connected to the pressure vessel by a supply pipe to supply the receiving space with condensing water.

The supply tank may include a temperature sensor for sensing a temperature in the receiving space, and the supply pipe may be provided with a supply valve which opens the supply pipe when the temperature in the receiving space is increased to be equal to or greater than a set temperature.

The cooling system may further include a gas recovery pipe connected to the pressure vessel and the containment structure such that gas generated within the pressure vessel flows into the containment structure.

The cooling system may further include a bypass pipe connecting the release pipe to the pressure vessel.

The bypass pipe may further include a bypass valve to control opening and closing of the bypass pipe. The bypass pipe may be connected to a position higher than the level of the condensed water in the pressure vessel.

The release pipe may include a second release valve located between a portion from which the bypass pipe diverges and a portion to which the pressure vessel is connected.

Another aspect of the invention provides a nuclear power plant, which comprises: a nuclear reactor containment structure defining an interior space in which a nuclear reactor is located; a cooling vessel comprising a water tank and a plurality of cooling fins connected to the water tank; a vapor release pipe connecting between the interior space of the containment structure and the water tank, the vapor release pipe being configured to transfer vapor from the interior space to the water tank based on a pressure difference between the interior space and the water tank; a water return pipe connecting between the water tank and the interior space of the containment structure, the water return pipe being configured to transfer water from the water tank to the interior space of the containment space based on a water head difference between water contained in the water tank and water in the interior space of the containment structure such that water condensed from vapor transferred to the water tank is spontaneously returned to the interior space of the containment structure from the water tank even in the absence of pumping.

In the foregoing nuclear power plant, the water tank may have a first bottom surface lower than a second bottom surface of the interior space of the containment structure by a predetermined height such that the water tank has a volume to contain water under the level of the second bottom surface sufficient to maintain the water head in the water tank lower than the second bottom surface for a substantial period after vapor begins to be transferred from the containment structure to the water tank.

BRIEF DESCRIPTION OF THE DRAWINGS

The above and other features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

A cooling system of a nuclear reactor containment structure according to exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
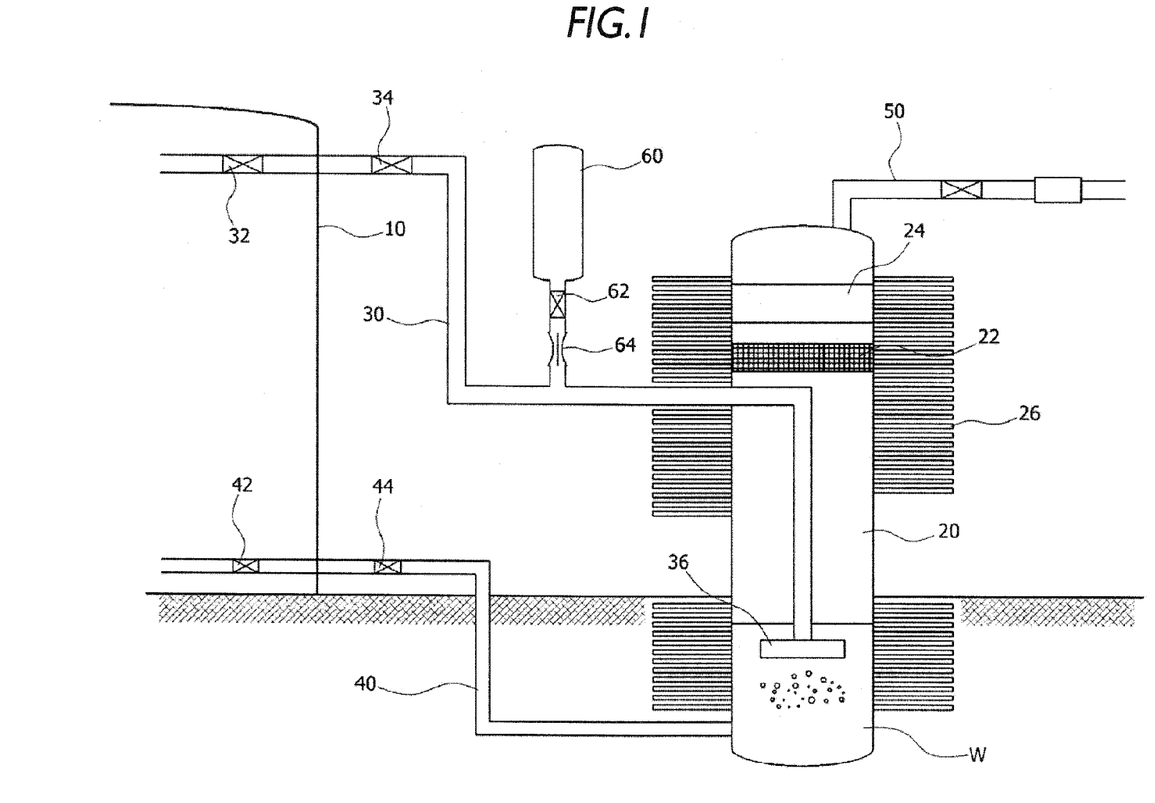
FIG. 1 is a diagram illustrating an overall structure of a cooling system of a nuclear reactor containment structure according to a first embodiment of the present invention.

FIG. 1 is a diagram illustrating an overall structure of a cooling system of a nuclear reactor containment structure according to a first embodiment of the present invention.

As shown in FIG. 1, the cooling system of a nuclear reactor containment structure according to the first embodiment of the present invention includes a containment structure 10, a pressure vessel or water tank 20, a release pipe 30, and a recovery pipe 40.

The containment structure 10 is a structure housing a nuclear reactor and is formed in the form of a typical building to include various related facilities therein.

The pressure vessel 20 receives condensed water W therein and has a receiving space located such that at least a portion of the pressure vessel is lower than a bottom of the containment structure 10. In the present embodiment, the pressure vessel 20 is buried under the ground at a lower portion thereof, and thus the buried portion is located lower than the bottom of the containment structure 10.

The release pipe 30 connects an inner portion of the containment structure 10 to an inner portion of the pressure vessel 20 such that water vapor and fission products generated in the containment structure 10 in the event of an accident may flow into the pressure vessel 20.

The recovery pipe 40 connects the inner portion of the pressure vessel 20 to the inner portion of the containment structure 10 such that the condensed water W received in the pressure vessel 20 may flow into the containment structure 10.

That is, the water vapor generated in the containment structure 10 in the event of an accident flows toward the pressure vessel 20 so that a level of the condensed water W becomes high as the water vapor is cooled by the condensed water W. When the level of the condensed water W received in the pressure vessel 20 is higher than a water level in the containment structure 10, the condensed water W may flow from the pressure vessel 20 toward the containment structure 10 by a water head difference.

Accordingly, the present invention may decrease a temperature in the containment structure 10 over a long period of time due to natural convection generated by the water head difference without separate supply of power or an operator's operation.

Hereinafter, the above circulation process will be described in more detail.

Figure 2:
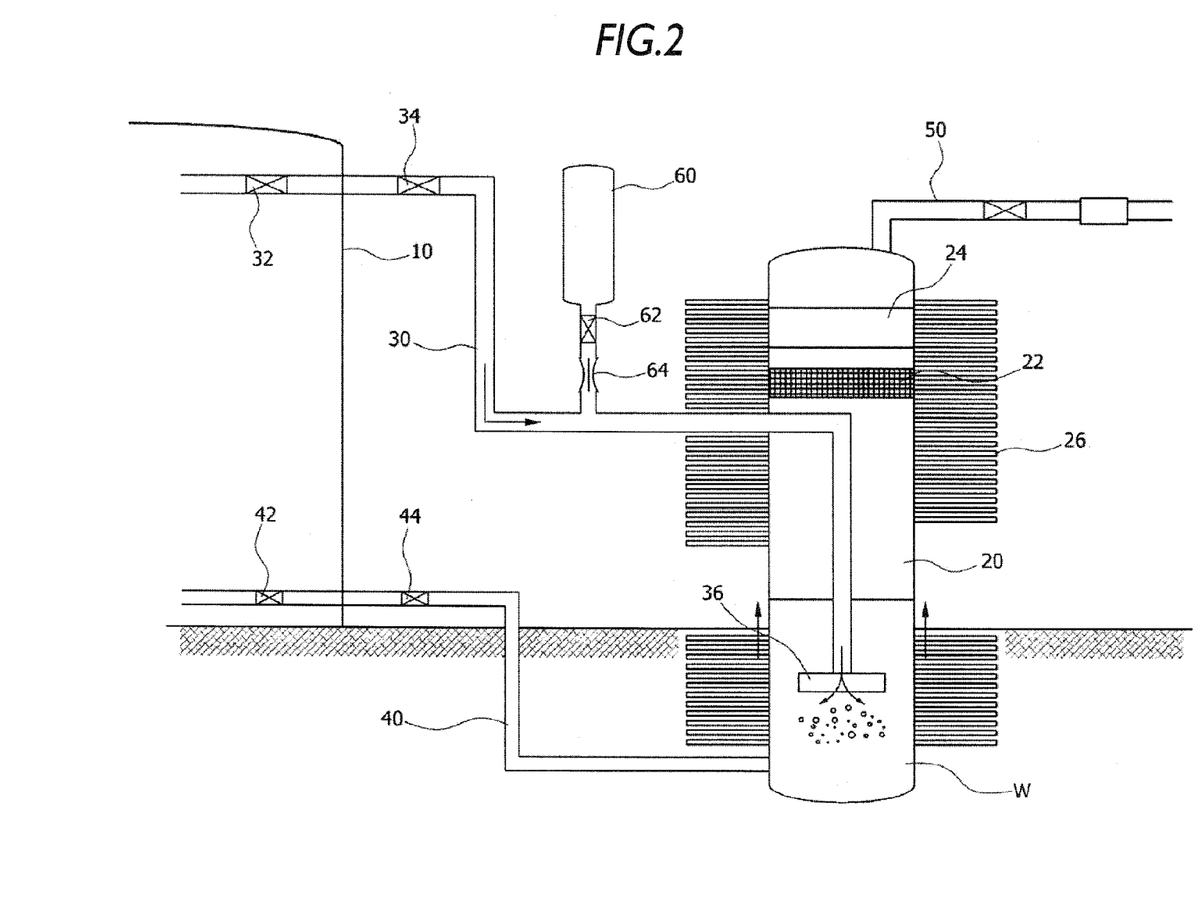
FIG. 2 is a diagram illustrating a state in which water vapor and fission products generated in a containment structure flow into a pressure vessel in the cooling system of a nuclear reactor containment structure according to the first embodiment of the present invention.
Figure 3:
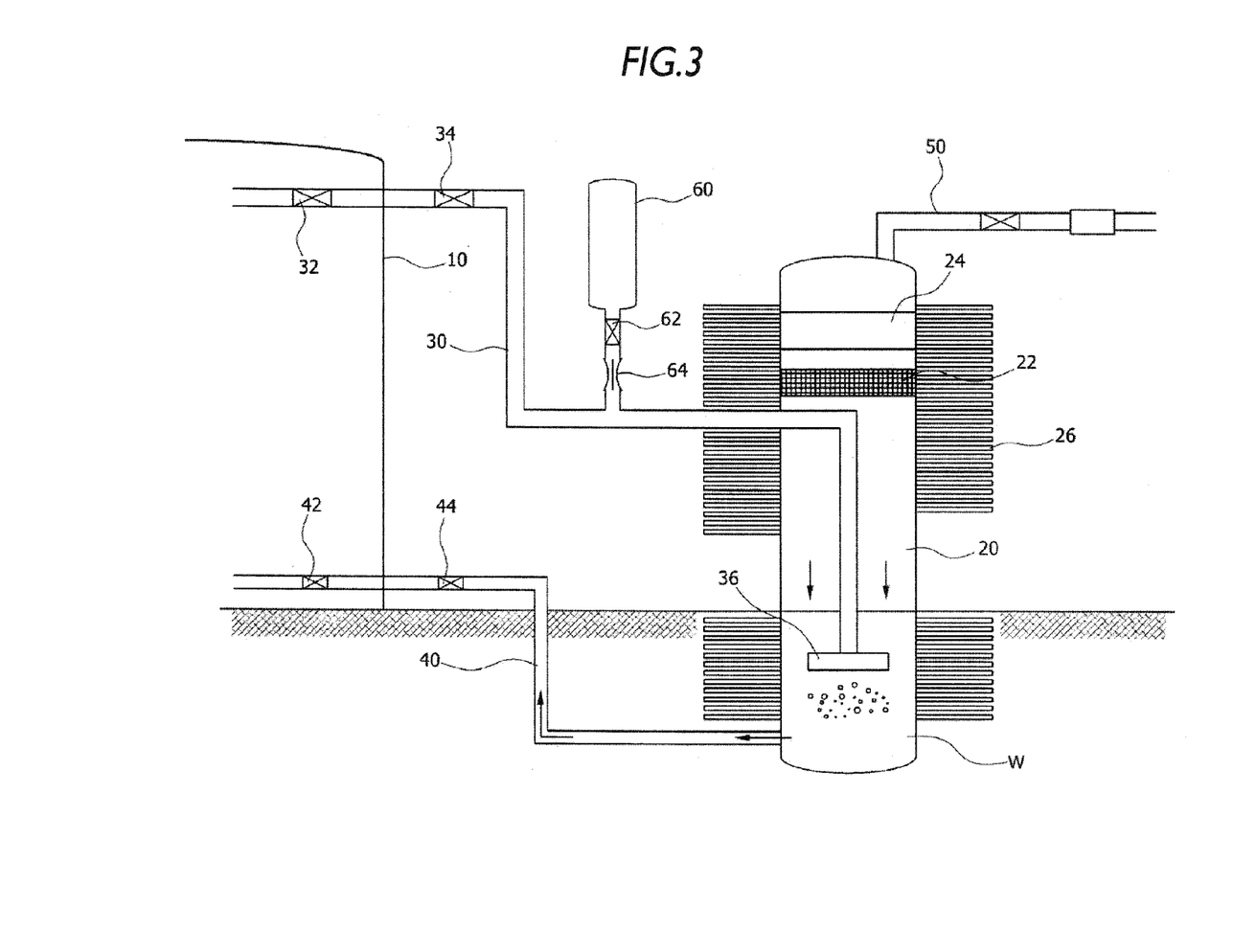
FIG. 3 is a diagram illustrating a state in which condensed water in the pressure vessel flows toward the containment structure in the cooling system of a nuclear reactor containment structure according to the first embodiment of the present invention.

FIG. 2 is a diagram illustrating a state in which water vapor and fission products generated in the containment structure 10 flow into the pressure vessel 20 in the cooling system of a nuclear reactor containment structure according to the first embodiment of the present invention. FIG. 3 is a diagram illustrating a state in which condensed water W in the pressure vessel 20 flows toward the containment structure 10 in the cooling system of a nuclear reactor containment structure according to the first embodiment of the present invention.

As shown in FIGS. 2 and 3, when water vapor is released from the containment structure 10 to the pressure vessel 20, the water vapor is condensed within the condensed water W and the level of the condensed water W gradually becomes high. However, since the recovery pipe 40 is connected to the containment structure 10, the condensed water W may be naturally circulated by a difference between the level of the condensed water W in the pressure vessel 20 and the water level in the containment structure 10.

In this case, one or more radiation fins 26 are installed outside the pressure vessel 20 in the present embodiment. The radiation fins 26 serve to remove heat accumulated in the condensed water W by vapor condensation and residual heat generated by the fission products accumulated inside the pressure vessel 20. That is, the condensed water W in the pressure vessel 20 may continue to be cooled so as to continuously have a density higher than that of liquid in the containment structure 10.

Accordingly, when the level of the condensed water W in the pressure vessel 20 simultaneously becomes high while the water vapor generated in the containment structure 10 is condensed by the above-mentioned configuration, the cooling system has a structure in which the condensed water W may be circulated into the containment structure 10 by the water head difference.

In the embodiment, the cooling system further includes an exhaust pipe 50 connected to the pressure vessel 20 such that gas generated in the pressure vessel 20 is discharged out thereof through the exhaust pipe 50. In this case, the pressure vessel 20 may include a filter 24 for removal of fission products and a moisture separator 22 located beneath the filter 24.

Meanwhile, the water vapor and fission products within the containment structure 10 are released through the release pipe 30 to the pressure vessel 20. In this case, the water vapor is condensed by the condensed water W in the pressure vessel 20. The fission products are primarily removed by the condensed water W and are additionally removed by the filter 24, so that only non-condensable gas which does not include the fission products is released to the outside through the exhaust pipe 50.

A discharge valve may be installed at the exhaust pipe 50, and may have a rupture disc structure which is operated by an operator or is automatically opened by pressure. In addition, an exhaust filter may be additionally installed at the exhaust pipe 50. Consequently, it may be possible to further increase filtering performance.

In the embodiment, a release isolation valve 32 is provided in an inner exposed portion of the containment structure 10 on the release pipe 30 and a first release valve 34 is provided in an outer exposed portion of the containment structure 10 on the release pipe 30. The two valves are closed during a normal operation and are automatically and sequentially opened according to an operator's operation or increases in temperature and pressure when an accident occurs. Arrangement of the two valves in a row is to prevent the water vapor and the fission products from being discharged out of the containment structure 10 by a single malfunction of the operator during the normal operation.

Similarly, in the embodiment, a recovery isolation valve 42 is provided in an inner exposed portion of the containment structure 10 on the recovery pipe 40 and a recovery valve 44 is provided in an outer exposed portion of the containment structure 10 on the recovery pipe 40. The two valves are closed during the normal operation and are automatically and sequentially opened according to the operator's operation or increases in temperature and pressure when an accident occurs. Arrangement of the two valves in a row is to prevent the condensed water W from being introduced into the containment structure 10 by a single malfunction of the operator during the normal operation.

In the embodiment, non-condensable gas is stored in the release pipe 30 and the release pipe is provided with a gas tank 60 to which the non-condensable gas is selectively released. In addition, the gas tank 60 is further provided with a gas release valve 62 for adjusting release of the non-condensable gas and a gas flow restrictor 64 for controlling a release amount of the non-condensable gas. In this case, the non-condensable gas may be vaporized nitrogen gas, etc.

Accordingly, the water vapor and the fission products may be additionally mixed with the non-condensable gas when flowing toward the pressure vessel 20, so as to be together released to the condensed water W through a release port 36. Consequently, it is possible to prevent water hammer from occurring when the water vapor is released due to the fact that the condensed water W in the pressure vessel 20 is overcooled in an initial stage of the accident.

Meanwhile, when the water vapor and the fission products are introduced into the pressure vessel 20, the water vapor is condensed by the condensed water W. Most of the fission products are collected in the condensed water W, and the remaining non-condensable gas and a portion of the fission products pass through the filter 24 disposed at an upper portion of the pressure vessel 20. Subsequently, the fission products and aerosols are additionally removed by the filter 24, and only non-condensable gas which barely includes the fission products may be discharged to the atmosphere through the exhaust pipe 50.

The moisture separator 22 is provided beneath the filter 24 as described above, and water droplets released together with the volatile fission products and the non-condensable gas are removed by the moisture separator 22 and are recovered toward the condensed water W. Consequently, only a gas component is discharged to the filter 24, thereby enabling removal performance of the fission products by the filter 24 to be improved.

Figure 4:
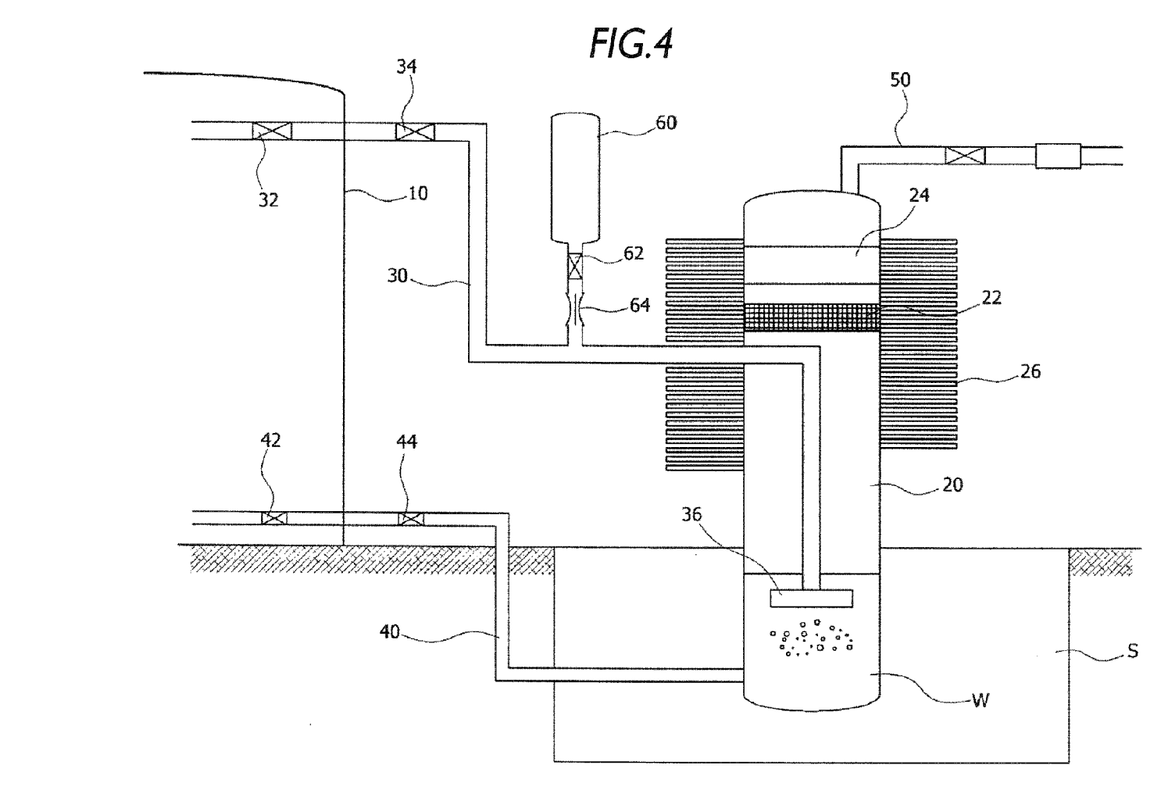
FIG. 4 is a diagram illustrating an overall structure of a cooling system of a nuclear reactor containment structure according to a second embodiment of the present invention.

FIG. 4 is a diagram illustrating an overall structure of a cooling system of a nuclear reactor containment structure according to a second embodiment of the present invention.

As shown in FIG. 4, the cooling system of a nuclear reactor containment structure according to the second embodiment of the present invention has configurations similar to those of the above-mentioned first embodiment, but differs in that a cooling pool receiving cooling water S is formed around the lower portion of the pressure vessel 20. In the present embodiment, the cooling pool has a predetermined depth defined under the ground surface so that a lower portion of the pressure vessel 20 is exposed to the cooling water S. Thus, the cooling pool may reduce an increase in temperature within the pressure vessel 20, together with the radiation fins 26.

Figure 5:
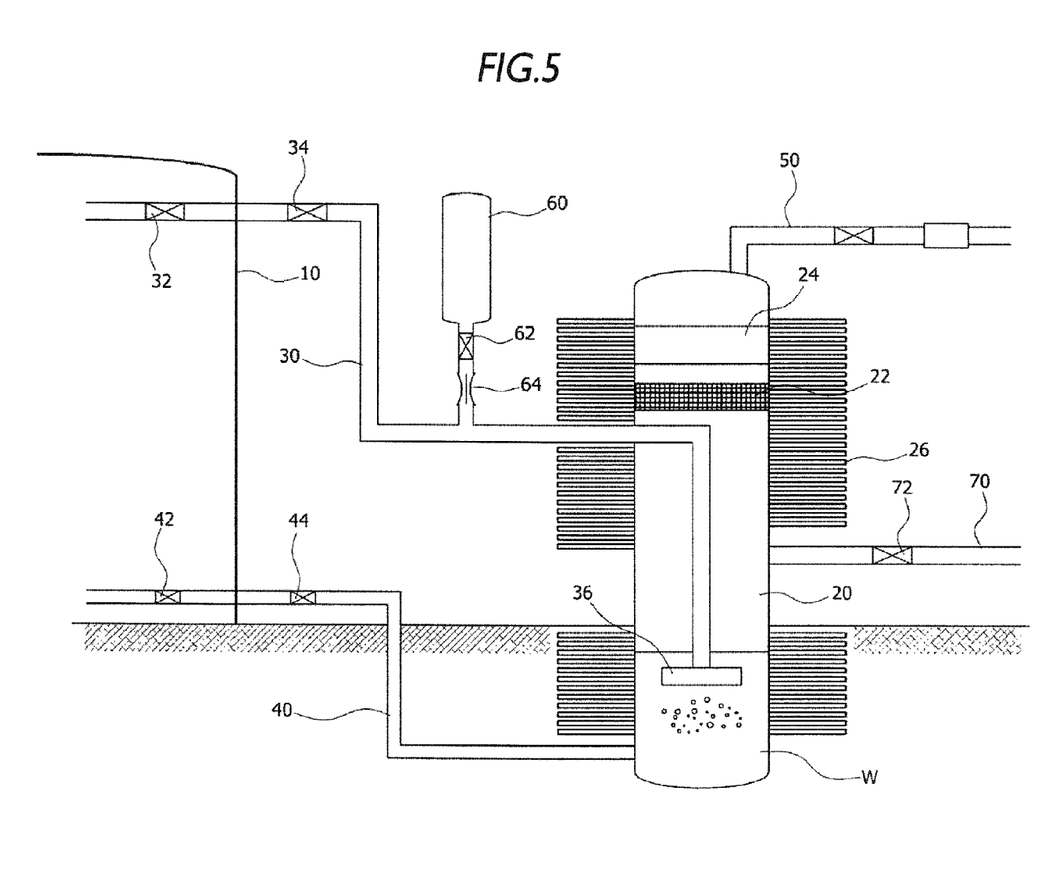
FIG. 5 is a diagram illustrating an overall structure of a cooling system of a nuclear reactor containment structure according to a third embodiment of the present invention.

FIG. 5 is a diagram illustrating an overall structure of a cooling system of a nuclear reactor containment structure according to a third embodiment of the present invention.

As shown in FIG. 5, the cooling system of a nuclear reactor containment structure according to the third embodiment of the present invention has configurations similar to those of the above-mentioned first embodiment, but differs in that the cooling system further includes a supply tank connected to the pressure vessel 20 by a supply pipe 70 to supply the receiving space with condensing water. Since the provision of the supply tank allows the condensed water W in the pressure vessel 20 having an increased temperature equal to or greater than a certain degree to be supplied with new condensing water, the temperature in the pressure vessel may be decreased.

The supply tank may include a temperature sensor for sensing a temperature in the receiving space, and the supply pipe 70 may be provided with a supply valve 72 which opens the supply pipe 70 when the temperature in the receiving space is increased to be equal to or greater than a set temperature. That is, the supply valve 72 is opened when the temperature in the receiving space is increased to be equal to or greater than a certain degree, so that condensed water may be supplied thereto.

Figure 6:
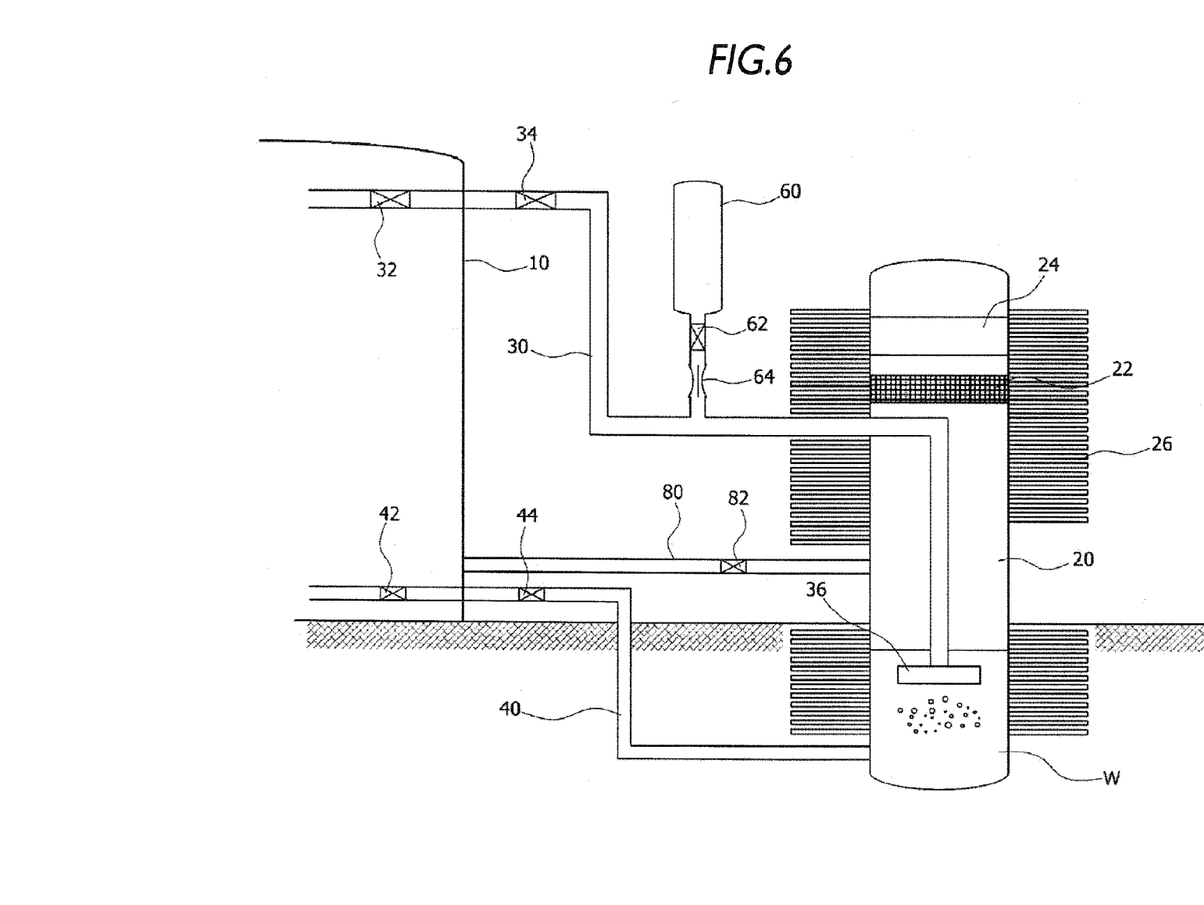
FIG. 6 is a diagram illustrating an overall structure of a cooling system of a nuclear reactor containment structure according to a fourth embodiment of the present invention.

FIG. 6 is a diagram illustrating an overall structure of a cooling system of a nuclear reactor containment structure according to a fourth embodiment of the present invention.

As shown in FIG. 6, the cooling system of a nuclear reactor containment structure according to the fourth embodiment of the present invention has configurations similar to those of the above-mentioned first embodiment, but differs in that the exhaust pipe provided in the first embodiment is omitted and the cooling system further includes a gas recovery pipe 80 connected to the pressure vessel 20 and the containment structure 10 such that gas generated within the pressure vessel 20 flows into the containment structure 10.

That is, in the present embodiment, non-condensable gas generated within the pressure vessel 20 may flow toward the containment structure 10 through the gas recovery pipe 80. In this case, the gas recovery pipe 80 may be further provided with a gas recovery pipe isolation valve 82 for opening and closing of the gas recovery pipe 80 and prevention of a backflow.

Figure 7:
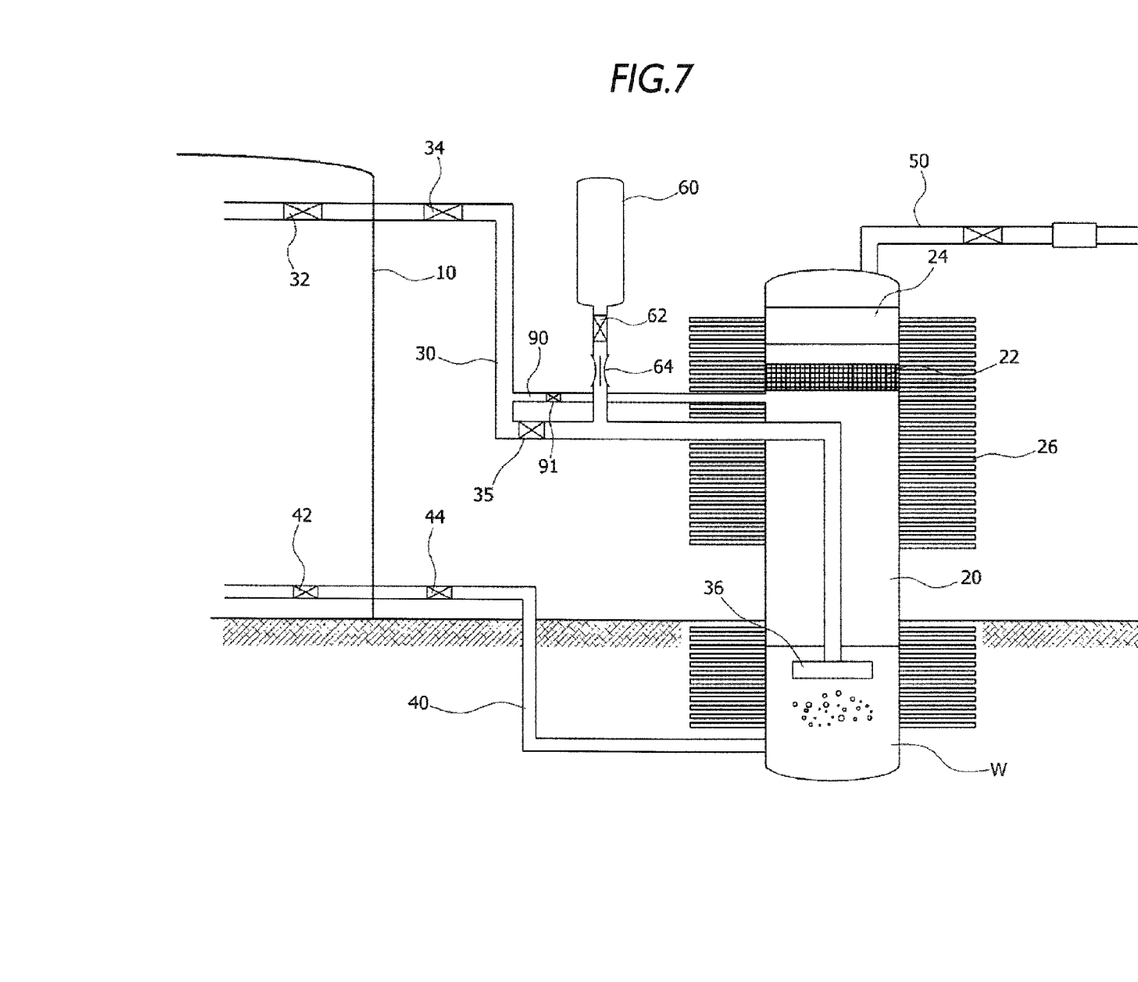
FIG. 7 is a diagram illustrating an overall structure of a cooling system of a nuclear reactor containment structure according to a fifth embodiment of the present invention.

FIG. 7 is a diagram illustrating an overall structure of a cooling system of a nuclear reactor containment structure according to a fifth embodiment of the present invention.

When a pressure in the containment structure 10 is greater than that in the pressure vessel 20, condensed water W does not flow into the containment structure 10 through the recovery pipe 40. To prevent this phenomenon, the cooling system of a nuclear reactor containment structure according to the fifth embodiment of the present invention has configurations similar to those of the above-mentioned first embodiment, but differs in that the cooling system further includes a bypass pipe 90 connecting the release pipe 30 to the pressure vessel 20. That is, the bypass pipe 90 serves to allow the pressure in the containment structure 10 to be equal to that in the pressure vessel 20, so that the condensed water W may be easily introduced into the containment structure 10 through the recovery pipe 40. The bypass pipe 90 may further include a bypass valve 91 to control opening and closing of the bypass pipe 90, so that the bypass pipe 90 may be selectively opened and closed as needed. Furthermore, the bypass pipe 90 may be connected to a position higher than the level of the condensed water W in the pressure vessel 20 so as to prevent the condensed water W from being introduced into the bypass pipe 90. In addition, the release pipe 30 may further include a second release valve 35 located between a portion from which the bypass pipe 90 diverges and a portion to which the pressure vessel 20 is connected, so that the pressure in the containment structure 10 may be more efficiently regulated to be equal to that in the pressure vessel 20. In detail, since the bypass pipe 90 is opened by adjustment of the bypass valve 91 and the release pipe 30 is closed by adjustment of the second release valve 35, the bypass pipe 90 may function more efficiently.

In embodiments, a nuclear power plant may include a nuclear reactor containment structure defining an interior space in which a nuclear reactor is located. The plant further includes a cooling vessel comprising a water tank and a plurality of cooling fins connected to the water tank; a vapor release pipe connecting between the interior space of the containment structure and the water tank; and a water return pipe connecting between the water tank and the interior space of the containment structure. In embodiments, the vapor release pipe is configured to transfer vapor from the interior space to the water tank based on a pressure difference between the interior space and the water tank. The water return pipe is configured to transfer water from the water tank to the interior space of the containment space based on a water head difference between water contained in the water tank and water in the interior space of the containment structure such that water condensed from vapor transferred to the water tank is spontaneously returned to the interior space of the containment structure from the water tank even in the absence of pumping.

In embodiments, the water tank may have a first bottom surface lower than a second bottom surface of the interior space of the containment structure by a predetermined height such that the water tank has a volume to contain water under the level of the second bottom surface sufficient to maintain the water head in the water tank lower than the second bottom surface for a substantial period after vapor begins to be transferred from the containment structure to the water tank. In certain embodiments, the substantial period is about 3 hours, about 4 hours, about 5 hours, about 6 hours, about 7 hours, about 8 hours, about 10 hours, about 12 hours, about 15 hours, about 18 hours, about 24 hours, about 1.5 days, about 2 days, about 3 days, about 4 days, about 5 days, about 6 days, about 7 days, about 10 days, or about 14 days.

As is apparent from the above description, a cooling system of a nuclear reactor containment structure according to the present invention may form a circulation structure by natural convection without separate supply of power or an operator's operation so as to decrease a temperature in the nuclear reactor containment structure over a long period of time.

In addition, it may be possible to prevent deterioration of removal performance of fission products which may occur during cooling.

Furthermore, it may be possible to prevent damage of pipes and devices caused by water hammer in an initial operation of the cooling system.

Although the present invention has been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A nuclear power plant comprising:
   a nuclear reactor containment structure defining an interior space in which a nuclear reactor is located;
   a cooling vessel comprising a water tank located outside the nuclear reactor containment structure, wherein the water tank comprises a portion that is lower than the bottom of the interior space of the nuclear reactor containment structure;
water contained in the water tank:
a vapor release pipe connecting between the interior space of the nuclear reactor containment structure and the water tank, the vapor release pipe being configured to transfer vapor from the interior space to the water tank based on a pressure difference between the interior space and the water tank; and
a water return pipe connecting between the water tank and the interior space of the nuclear reactor containment structure, the water return pipe being configured to transfer water from the water tank to the interior space of the nuclear reactor containment structure based on a water head difference between water contained in the water tank and water in the interior space of the nuclear reactor containment structure,
wherein the water is contained in the water tank only in the portion such that the water head in the water tank is lower than the bottom of the interior space of the nuclear reactor containment structure such that the water would not automatically flow from the water tank to the nuclear reactor containment structure during normal operation of the nuclear power plant,
wherein in the event of an accident, the vapor release pipe is configured to transfer vapor from the interior space to the water tank where it condenses, which causes the water head in the water tank to rise to a level higher than the bottom of the interior space of the nuclear reactor containment structure such that is automatically returned to the interior space of the nuclear reactor containment structure from the water tank even in the absence of pumping.

2. The nuclear power plant of claim 1, wherein the water tank has a bottom surface lower than the bottom of the interior space such that the water tank has a volume configured to contain water under the level of the bottom surface of the interior space sufficient to maintain the water head in the water tank lower than the bottom surface of the interior space for about 3 hours after vapor begins to be transferred from the nuclear reactor containment structure to the water tank.

3. A cooling system of a nuclear power plant, comprising:
a pressure vessel located outside a nuclear reactor containment structure, the pressure vessel having a water tank, the nuclear reactor containment structure defining an interior space for housing a nuclear reactor, wherein the water tank comprises a portion that is lower than the bottom of the interior space of the nuclear reactor containment structure;
water contained in the water tank;
a release pipe connecting between the interior space of the nuclear reactor containment structure and the water tank, the release pipe being configured to transfer water vapor and fission products generated in the nuclear reactor containment structure in the event of an accident to the water tank;
a water return pipe connecting between the water tank and the interior space of the nuclear reactor containment structure, the water return pipe being configured to transfer water from the water tank to the interior space based on a water head difference between water contained in the water tank and water in the interior space of the containment structure,
wherein the water is contained in the water tank only in the portion such that the water head in the water tank is lower than the bottom of the interior space of the nuclear reactor containment structure such that the water would not automatically flow from the water tank to the nuclear reactor containment structure during normal operation of the nuclear power plant,
wherein in the event of an accident, the release pipe is configured to transfer vapor from the interior space to the water tank where it condenses, which causes the water head in the water tank to rise to a level higher than the bottom of the interior space of the nuclear reactor containment structure such that water is automatically transferred to the interior space of the nuclear reactor containment structure from the water tank even in the absence of pumping.

4. The cooling system of claim 3, wherein the pressure vessel is provided with one or more heat-radiation fins.

5. The cooling system of claim 3, wherein a cooling pool containing water for cooling the pressure vessel is formed around a lower portion of the pressure vessel.

6. The cooling system of claim 3, further comprising an exhaust pipe connected to the pressure vessel such that gas generated within the pressure vessel is discharged out thereof through the exhaust pipe.

7. The cooling system of claim 6, wherein the pressure vessel comprises a filter for removal of fission products.

8. The cooling system of claim 7, wherein the pressure vessel comprises a moisture separator located beneath the filter.

9. The cooling system of claim 3, wherein the release pipe is provided with a release isolation valve located inside the containment structure and a release valve located outside the containment structure.

10. The cooling system of claim 3, wherein the water return pipe is provided with a recovery isolation valve located inside the containment structure, and a recovery valve located outside the containment structure.

11. The cooling system of claim 3, further comprising a supply tank connected to the pressure vessel by a supply pipe, the supply pipe configured to supply water to the water tank of the pressure vessel.

12. The cooling system of claim 11, wherein:
the supply tank comprises a temperature sensor configured for sensing a temperature in the water tank; and
the supply pipe is provided with a supply valve which is configured to open the supply pipe when the temperature in the water tank is equal to or greater than a set temperature.

13. The cooling system of claim 3, further comprising a gas recovery pipe connected to the pressure vessel and the containment structure such that gas generated within the pressure vessel flows into the containment structure.

14. The cooling system of claim 3, further comprising:
a gas tank containing non-condensable gas and connected to the release pipe, wherein in the event of an accident, the gas tank is configured to release the non-condensable gas into a flow of water vapor and fission products from the containment structure such that the non-condensable gas is released into water contained in the water tank together with the water vapor and fission products for preventing undesirable water hammer from occurring; and
a bypass pipe connecting between the containment structure and the pressure vessel while bypassing the gas tank.

15. The cooling system of claim 14, wherein the bypass pipe further comprises a bypass valve to control opening and closing of the bypass pipe.

16. The cooling system of claim 14, wherein the bypass pipe is connected to a position higher than the level of the condensed water in the pressure vessel.

17. The cooling system of claim 14, wherein the release pipe comprises a second release valve located between a portion from which the bypass pipe diverges and a portion to which the pressure vessel is connected.

18. The nuclear power plant of claim 14, wherein the non-condensable gas is nitrogen gas.

* * * * *

UNITED STATES PATENT AND TRADEMARK OFFICE
CERTIFICATE OF CORRECTION

PATENT NO. : 9,984,778 B2
APPLICATION NO. : 14/308524
DATED : May 29, 2018
INVENTOR(S) : Jin Ho Song et al.

Page 1 of 1

It is certified that error appears in the above-identified patent and that said Letters Patent is hereby corrected as shown below:

In the Claims

In Column 9 at Line 4, in Claim 1, change "*tank:*" to --*tank;*.--.

In Column 9 at Line 31, in Claim 1, after "*that*" insert --*water*.--.

Signed and Sealed this
Twenty-fifth Day of September, 2018

Andrei Iancu
*Director of the United States Patent and Trademark Office*